United States Patent Office 3,328,432
Patented June 27, 1967

3,328,432
NOVEL PROGESTERONE DERIVATIVES
Klaus Brückner, Darmstadt-Eberstadt, Karl-Heinz Bork, Nieder-Ramstadt, and Hans-Günther Kraft and Hartmut Kieser, Darmstadt, Germany, assignors to E. Merck Aktiengesellschaft, Darmstadt, Germany
No Drawing. Filed Apr. 24, 1964, Ser. No. 362,492
Claims priority, application Germany, Apr. 25, 1963, M 56,598; Jan. 18, 1964, M 59,598; Feb. 27, 1964, M 60,084; Feb. 29, 1964, M 60,121
8 Claims. (Cl. 260—397.4)

This invention relates to novel progesterone derivatives.

An object of this invention is to provide novel progesterone derivatives and processes for their production.

Another object is to provide novel pharmaceutical compositions based on these novel compounds.

A further object is to provide a process for effecting an ovulation inhibiting effect.

Upon further study of the specification and claims other objects and advantages of the present invention will become apparent.

To attain the objects of this invention there are provided progesterone derivatives of Formula I, as follows:

FORMULA I

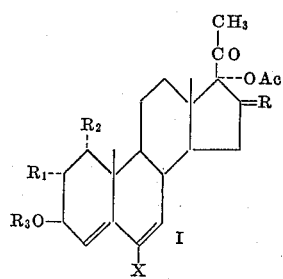

wherein

Ac is an acyl group of 1 to 6 carbon atoms,
R is H, H; $\alpha$H, $\beta$CH$_3$; $\beta$H, $\alpha$CH$_3$; or =CH$_2$
R$_1$ and R$_2$ are each H, or together —CH$_2$—;
R$_3$ is H, or acyl or alkyl with 1 to 6 carbon atoms in each,
X is Cl, F or CH$_3$ The acyl group at the 17-position is preferably hydrocarbon acyl, more preferably alkanoyl. The same holds true when R$_3$ is acyl. In general, however, either acyl can be the residue of any physiologically compatible acid. Preferred compounds are the acetates, propionates, butyrates, tert.butylacetates, trimethylacetates, valeriates and caproates.

The particularly preferred species embraced by Formula I are—

6-chloro-4,6-pregnadiene-3,17$\alpha$-diol-20-one-17-acetate
6-chloro-16-methylene-4,6-pregnadiene-3,17$\alpha$-diol-20-one-17-acetate
6-methyl-16-methylene-4,6-pregnadiene-3,17$\alpha$-diol-20-one-17-acetate
6-methyl-16-methylene-4,6-pregnadiene-3,17$\alpha$-diol-20-one-17-acetate
6,16-dimethyl-4,6-pregnadiene-3,17$\alpha$-diol-20-one-17-acetate
1$\alpha$,2$\alpha$-methylene-6-chloro-4,6-pregnadiene-3,17$\alpha$-diol-20-one-17-acetate
6-chloro-4,6-pregnadiene-3,17$\alpha$-diol-20-one-diacetate
6-chloro-4,6-pregnadiene-3,17$\alpha$-diol-20-one-3-acetate-17-caproate
6-chloro-16-methylene-4,6-pregnadiene-3,17$\alpha$-diol-20-one-diacetate
6-methyl-4,6-pregnadiene-3,17$\alpha$-diol-20-one-diacetate
6-methyl-16-methylene-4,6-pregnadiene-3,17$\alpha$-diol-20-one-diacetate
6,16-dimethyl-4,6-pregnadiene-3,17$\alpha$-diol-20-one-diacetate
1$\alpha$,2$\alpha$-methylene-6-chloro-4,6-pregnadiene-3,17$\alpha$-diol-20-one-diacetate
6-chloro-4,6-pregnadiene-3,17$\alpha$-diol-20-one-17-acetate-3-methylether
6-chloro-4,6-pregnadiene-3,17$\alpha$-diol-20-one-17-acetate-3-ethylether
6-chloro-16-methylene-4,6-pregnadiene-3,17$\alpha$-diol-20-one-17-acetate-3-methylether
6-chloro-16-methylene-4,6-pregnadiene-3,17$\alpha$-diol-20-one-17-acetate-3-ethylether
6-methyl-4,6-pregnadiene-3,17$\alpha$-diol-20-one-17-acetate-3-methylether
6-methyl-16-methylene-4,6-pregnadiene-3,17$\alpha$-diol-20-one-17-acetate-3-methylether
6,16-dimethyl-4,6-pregnadiene-3,17$\alpha$-diol-20-one-17-acetate-3-methylether
1$\alpha$,2$\alpha$-methylene-6-chloro-4,6-pregnadiene-3,17$\alpha$-diol-20-one-17-acetate-3-methylether The compounds of Formula I exhibit a substantial progestational action, and exert a strong anti-ovulatoric effect. Accordingly, they may be used for all types of pathological conditions usually treated with 17$\alpha$-hydroxyprogesterone derivatives such as 17$\alpha$-acetoxy-6$\alpha$-methylprogesterone.

The progestational activity of the new steroids can be shown in the Clauberg essay on young female rabbits (see, for instance, McPhail, Journal of Physiology, vol. 83, p. 145 (1935)).

For use of these compounds as ovulation inhibitors, it is advisable to combine them with estrogenic substances. Estrogenic compounds being particularly suitable for the purposes of the present invention are the following— estradiol-17-($\beta$-4-methoxyphenyl-propionate)
estradiol-17-p-tert.butylbenzoate
estradiol-17-($\beta$-tetrahydrofuryl-propionate)
estradiol-17-isocapronate
estradiol-17-valerinate
estradiol-17-p-chlorobenzoate
estradiol-17-palmitate
estradiol-17-acetate
estradiol-diacetate
estradiol-dipalmitate
estradiol-17-formiate
estradiol-17-butyrylacetate
estradiol-17-undecylate
estradiol-17-benzoate
estradiol-3-benzoate
estradiol-17-phenylpropionate
17-($\beta$-hydroxyethyl)-imino-1,3,5(10)-estratriene-3-ol
17$\alpha$-allylestradiol
17$\alpha$-allylestradiol-3-methylether
17$\alpha$-propargyl-estradiol
estrone
estradiol
estron-methylether
doisynolic acid
estradiol-3-cyclopentylether
estradiol-3-cyclopentylether-17-propionate
1-methyl-estradiol-3-methylether
1,17$\alpha$-dimethyl-estradiol-3-methylether
1-methyl-estradiol
1,17$\alpha$-dimethyl-estradiol
3,4-bis-(p-hydroxy-phenyl)-2,4-hexadiene
1-methyl-estradiol-3-cyclopentylether Preferred estogenic compounds are ethynyl estradiol, ethynyl estradiol methyl ether and the various mono- and di-esters of estradiol.

An advantage of the combination with the estrogenic compound is that in this way the presence of a sufficient amount of an estrogenic agent is warranted. As is well known, gestagenic compounds have only an effect on the endometrium if this is in the proliferation phase, the latter being induced by estrogenes. Thus, with such a combination the desired effect can even be obtained in cases where the production of estrogenes by the body is insufficient.

Furthermore, progestational agents often provoke breakthrough bleeding which may be avoided by administering the progestational agent in combination with an estorgenic compound.

Particularly preferred specific combinations of the compounds of this invention with estrogenic agents are the following, wherein there can be 0.1 to 0.005 part by weight of estrogenic material for one part by weight of a compound of this invention:

6-chloro-4,6-pregnadiene-3,17α-diol-20-one-17-acetate
ethynyl estradiol
6-chloro-4,6-pregnadiene-3,17α-diol-20-one-diacetate
ethynyl estradiol
6-methyl-16-methylene-4,6-pregnadiene-3,17α-diol-20-one-17-acetate-3-methylether
ethynyl estradiol-3-methylether
6-chloro-4,6-pregnadiene-3,17α-diol-20-one-17-acetate
estradiol-benzoate
6-chloro-4,6-pregnadiene-3,17α-diol-20-one-17-acetate
ethynyl estradiol methylether The compounds of this invention can be produced by treating a steroid of Formula I which has a keto group in the 3-position with a complex metal hydride, or by liberating a functionally altered hydroxyl group in the 3-position of such a steroid. Additionally, a progesterone derivative produced in this manner can be converted into a corresponding 3-alkyl-ether by reaction with alkylating or acylating agents.

As complex metal hydrides, use can be made, e.g. of lithium monohydrogen tri-tert.-butoxy-aluminate. The work is preferably done in the presence of a solvent such as dioxane, ether, tetrahydrofuran, benzene or toluene, or if sodium tetrahydrogen borate is used, then in a mixture of an alcohol, e.g. methanol, and water.

The temperatures that are to be used are between room temperature and the boiling point of the solvent that is present. By treatment with a complex metal hydride it is possible to hydrogenate the 3-keto-steroid starting material selectively in the 3-position without attacking the keto group in the 20-position.

In this invention the work can be commenced with those steroids of Formula I which have a functionally altered hydroxy group in the 3-position. The hydroxyl group can e.g. be an easily separable ether group, e.g. a tetrahydropyranyl- or α-ethoxyethyl-ether group. The work can also be commenced with compounds in which the hydroxyl group in the 3-position is present as an ester group, e.g. as an acetate, propionate, methane sulfonate or p-toluene sulfonate.

Such a functionally altered hydroxyl group can be liberated in the usual manner. Either acid or alkaline methods can be used. An especially suitable acid reaction medium is, e.g. HCl in methanol, while a suitable alkaline medium is sodium bicarbonate in methanol. Obviously, care should be taken not to saponify the hydroxyl group in the 17α-position simultaneously. Since, however, the hydroxyl group in the 17α-position is a tertiary OH group, it is easily possible to selectively saponify an ester group in the 3-position or to split off an easily separable ether group in that position without attacking the ester group in the 17α-position.

For esterification of the 3-hydroxy groups of steroids, any of the usual methods can be employed.

As esterifying agents, carboxylic acid halides can be used, especially carboxylic acid chlorides or the corresponding carboxylic acid anhydrides. The work is preferably done with a mixture of carboxylic acid halides and a lower aliphatic carboxylic acid anhydride, and possibly in the presence of an organic base such as pyridine or triethylamine. The acylation can also be accomplished with a mixture consisting of only the carboxylic acid anhydride and an organic base. For such an acylation, it is generally not necessary to add a special solvent because the starting materials are soluble in the acylation mixtures. The reaction temperatures are between room temperature and the boiling point of the acylation mixture. The time required for the reaction depends on the temperature and can be from a few hours to two days.

The acylation can also be performed with ketenes, and especially with ketene itself. It is generally done in the presence of an inert solvent such as acetone or dioxane, and can be accelerated by the addition of a strong acid such as p-toluene-sulfonic acid or sulfuric acid.

For the esterification the esters or the halides and anhydrides of the following acids or the acids themselves are especially suitable—formic, acetic, propionic, butyric, isobutyric, valeric, isovaleric, trimethyl acetic, caproic, and cyclopentane carboxylic acid.

The etherification of a hydroxyl group in the 3-position can generally be accomplished by any of the usual etherification methods. In each case the work is commenced either with two alcohols or with one alcohol or its corresponding alkali alcoholate and a reactive ester of the other alcohol. Such reactive esters are, e.g. the halides such as the chlorides, bromides and iodides, and also sulfuric acid esters or sulfonic acid esters such as the dialkyl sulfates, alkyl sulfuric acid salts, methane sulfonates and p-toluene sulfonate.

The etherification can be performed in the presence of a condensation agent. Such agents can be, e.g. alkali hydoxides, alcoholate formers such as alkali metals, alkali hydoxides, alkali amides or metal organic compounds such as lithium methyl. Other suitable condensation agents are halogen-ion-acceptors such as lead salts or silver compounds, e.g. silver oxide, -carbonate, -acetate, -nitrate, -perchlorate or -fluoroborate. If the work is commenced with two alcohols, it is advantageous to use acid catalysts or dehydrating agents, e.g. sulfuric acid or one of its acid salts such as potassium bisulfate or organic sulfonic acids such as p-toluene sulfonic acid or methane sulfonic acid, hydrochloric acid, phosphoric acid, boric acid, or Lewis acids such as, e.g. ferric chloride, stannic tetrachloride or zinc chloride. Also aluminum oxide can be used as a condensation agent.

It is advantageous to perform the reaction in the presence of a solvent. Suitable solvents for this purpose are hydrocarbons such as cyclohexane, benzene, toluene and xylene, or ethers such as tetrahydrofuran and dioxane, also acetonitrile, acetone, nitromethane and liquid ammonia. If the work is done under dehydrating conditions, it is advantageous to use solvents with the help of which the water that is formed during the reaction can be removed by azeotropic distillation, e.g. benzene or toluene. The alcoholate formation can also occur in liquid ammonia, with subsequent removal of the ammonia, the reaction then being performed in one of the above-mentioned solvents.

It is thus possible, e.g. for a 3-hydroxy compound ($R_3$=H) to be reacted with an alcohol of 1 to 6 carbon atoms. Suitable alcohols are methanol, ethanol, n- and isopropanol, n-, iso- and tert. butanol, as well as the various isomeric pentanols and hexanols. The reaction times are between about 15 minutes and 24 hours. The reaction mixture is generally heated up to the boiling point of the alcoholic component. This reaction can be performed either in the presence or in the absence of condensation agents. Suitable condensation agents are the above-named acid catalysts.

The alkylation of a 3-hydroxy compound can be performed with the corresponding alkyl halide with the separation of hydrogen halide. The reaction mixture generally has added to it here an alkaline reacting substance, preferably a tertiary base such as pyridine or triethylamine. The reaction temperatures are between about 150 and 250° C. The resulting hydrogen halide becomes attached to the tertiary base. It is advantageous to introduce the corresponding alkyl bromide because it reacts more readily than the chloride.

Instead of the 3-hydroxy compounds, it is also possible to use the corresponding alkali alcoholates which can be reacted with inorganic acid esters, e.g. with alkyl halides, dialkyl sulfates and alkyl sulfate salts. Use is also made occasionally of the corresponding silver salts instead of the alkali alcoholates.

The reaction of dialkyl sulfates with alcohols is generally restricted to the production of the methyl and ethyl ethers of Formula I because dimethyl- and diethyl-sulfate are much easier to obtain than their higher homologues. The reaction is performed in such a manner that the solution of the 3-hydroxy compound is reacted with alkalies, e.g. sodium or potassium hydroxide or alkali bicarbonates. After addition of the calculated amount of dialkyl sulfate, the reaction mixture is agitated. Heating is generally not necessary. The reaction times are from a few minutes to several hours. Suitable solvents are e.g. dimethyl sulfoxide, dimethyl formamide, benzene, toluene, xylene or cyclohexane.

It is also possible, instead of the dialkyl sulfates, to use the alkyl sulfuric acid salts. This reaction can generally be accelerated by heating under reflux.

The esterification can also be performed by reaction with diazo alkanes. The reaction will occur readily in a dilute solution in the cold, especially in the presence of acid catalyst, and with almost the theoretical yield. As a solvent for this reaction ether is preferred, but chloroform, methylene, chloride, acetone, and other inert solvents can also be used.

The 3-alkyl ethers can also be produced by reaction with the olefins corresponding to the above-named alcohols. The isobutyl ether, e.g. is obtained by reaction of the 3-hydroxy compound corresponding to Formula I with isobutene. The reaction occurs in polar solvents such as chloroform or methylene chloride, and in the presence of acid catalysts such as sulfuric acid, phosphoric acid or fluorboric acid. The reaction mixture generally has added to it an excess of liquid isobutene and is then agitated while in a pressure vessel and finally worked up in the usual manner.

Furthermore, the 3-hydroxy compounds corresponding to Formula I can be first converted by known methods into easily decomposable esters, e.g. into tosylates or mesylates which can be obtained by the usual reaction of the hydroxy compound with tosyl chloride or mesyl chloride in pyridine or some other tertiary base, e.g. triethylamine. The reaction usually requires the mixture to stand several hours at room temperature. An ester thus produced can then be converted with an alcohol into the desired 3-ethers of Formula I. For that purpose the reaction mixture is generally heated a long time (2 to 30 hours) to the boiling point. Sometimes it is advantageous to perform the reaction in a closed tube. By this method 3α- as well as 3β-ethers can be formed because the position of the 3-hydroxyl group can change during the reaction (Walden inversion).

The 3-keto-steroids which are to be used as starting material are in most cases known, while the remaining ones can be produced from known compounds by the usual methods of steroid chemistry. For example, in a 3-keto-4-ene-steroid which is saturated in the 6-position, a double bond can be formed in that position by reaction with chloranil. 16-methyl-derivatives (α and β) can be produced by known hydrogenation methods from the corresponding 16-methylene compounds. The 1α, 2α-methylene compounds are obtained from the corresponding 1-dehydro-derivatives by addition of diazomethane to the 1,2-double bond and subsequent decomposition of the pyrazoline derivative. If the desired starting material is to have a chlorine substituent in the 6-position, then this can be introduced by reaction of the corresponding 3-ethylene-enol-ether with N-chloro-succinimide. The 6β-chloro-compound thus produced is then dehydrogenated with chloranil in the usual manner. The 17-ester groups (Ac in Formula I) can be introduced into the starting materials by similar known methods, and if desired, the 17-acetates can then be converted into the 17α-hydroxy compounds by the usual reactions.

The novel compounds of this invention are advantageously administered in dosage units of 1 to 100 mg. They can be incorporated in the usual pharmaceutical preparations. As carrier substances for pharmaceutical preparations, use can be made of those substances which are inert toward the new steroids, as for example water, vegetable oils, gelatins, lactose, polyethylene glycol, starch, magnesium stearate, talc, etc. For parenteral application, use can be made of solutions, preferably oily or aqueous solutions, and also of suspensions or emulsions. For internal application, tablets or dragees can be used in conjunction with the usual additives and ancillary substances such as preservatives, stabilizers or wetting agents.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

(a) 2 g. 6-chloro-6-dehydro-17α-acetoxy-progesterone are dissolved in 256 ml. methanol. A current of nitrogen is passed 20 minutes through the solution, and then a mixture of 1.5 ml. NaOH solution (2.5 n) and 41.2 ml. of an aqueous sodium borohydride solution (0.18 n) is added. The mixture is allowed to stand 10 minutes at room temperature and is then stirred into about 3.1 liter water. The crystals are filtered off with suction, washed with water, and dried over phosphorus pentoxide. After recrystallization from methanol/chloroform there is obtained pure 6-chloro-4,6-pregnadiene-3β,17α-diol-20-one-17-acetate. M.P. 226–227° C.; $\lambda_{max}$ 236, 243.5, 252 mμ; $E_{1cm}^{1\%}$ 502, 580, 398, $(a)_D$ —80° (chloroform)

In an analogous manner there is produced from 6-fluoro-6-dehydro-17α-acetoxy-progesterone, the 6-fluoro-4,6-pregnadiene-3β,17α-diol-20-one-17-acetate;

From 6-chloro-6-dehydro-16α - methyl - 17α-acetoxy-progesterone, the 6-chloro-16α-methyl-4,6-pregnadiene-3β,17α-diol-20-one-17-acetate;

From 6-fluoro-6-dehydro - 16α-methyl - 17α-acetoxy-progesterone, the 6-fluoro-16α - methyl-4,6-pregnadiene-3β,17α-diol-20-one-17-acetate;

From 6-chloro-6-dehydro-16β - methyl-17α - acetoxy-progesterone, the 6-chloro-16β-methyl - 4,6-pregnadiene-3β,17α-diol-20-one-17-acetate; and From 6-fluoro-6-dehydro-16β - methyl-17α - acetoxy-progesterone, the 6-fluoro-6 - dehydro-16β-methyl-4,6-pregnadiene-3β,17α-diol-20-one-17-acetate.

In a similar manner it is possible to produce the 17-formate, -acetate, -propionate, -n-butyrate, -iso-butyrate, -n-valerate, -iso-valerate, -trimethylacetate, -caproate and -cyclopentyl-carbonates of the named compounds by using the desired 17-acylate as the starting material.

(b) A solution of 7 g. 6-chloro-4,6-pregnadiene-3β,17α-diol-20-one-17-acetate in 17 ml. pyridine and 70 ml. acetic anhydride is allowed to stand 18 hours at room temperature and is then poured into ice water. The precipitated crystals are filtered off with suction and recrystallized from ethyl acetate. The yield is 6 g. 6-chloro-4,6-pregnadiene-3β,17α-diol-20-one-diacetate. M.P. 234–235° C.

(c) The solution of 1.8 g. 6-chloro-4,6-pregnadiene-3β,17α-diol-20-one-17-acetate in 180 ml. methanol is heated one hour under reflux and is then concentrated to incipient crystallization. The crystals are filtered off with suction and recrystallized from methanol. The 6-chloro-4,6-pregnadiene-3β,17α-diol-20-one - 17-acetate-3-methyl-ether melts at 184–185° C. UV maxima; 236, 244, 252 mμ;

$$E_{1cm}^{1\%} \; 485, 565, 382$$

In an analogous manner there is obtained—

From 0.5 g. 6-chloro-4,6-pregnadiene-3β,17α-diol-20-one-17-acetate, after heating 1 hour in 50 ml. n-butanol, 0.3 g. 6-chloro-4,6-pregnadiene-3β,17α - diol-20-one-17-acetate-3-butyl-ether;

From 0.5 g. 6-chloro-4,6-pregnadiene-3β,17α-diol-20-one-17-acetate, after heating 2 hours in 120 ml. n-hexyl alcohol, 0.35 g. 6-chloro-4,6-pregnadiene-3β,17α-diol-20-one-17-acetate-3-hexyl ether;

From 0.5 g. 6-chloro-4,6-pregnadiene-3β,17α-diol-20-one-17-acetate, after heating 1 hour in 50 ml. n-propyl alcohol, 0.25 g. 6-chloro-4,6-pregnadiene-3β,17α-diol-20-one-17-acetate-3-propyl ether; and From 0.5 g. 6-chloro-4,6-pregnadiene-3β,17α-diol-20-one-17-acetate, after heating 1 hour in 50 ml. ethanol, 0.3 g. 6-chloro-4,6-pregnadiene - 3β,17α-diol-20-one-17-acetate-3-ethyl-ether.

EXAMPLE 2

(a) 5 g. 6-chloro-6-dehydro-17α-caproyl-oxy-progesterone are dissolved in 60 ml. dioxane and after addition of a solution of 130 mg. lithium aluminum hydride in dioxane, are warmed one hour at 100° C. The reaction mixture is then diluted with water, the 6-chloro-4,6-pregnadiene-3β,17α-diol - 20-one-17-caproate shaken out with chloroform, and after being worked up in the usual manner is recrystallized from methanol. $\lambda_{max}$ 236, 243.5 and 252 mμ.

(b) By analogy to Example 1(b), the product obtained from Example 2(a) is converted into 6-chloro-4,6-pregnadiene-3β,17α-diol-20-one-3-acetate-17-caproate.

(c) To a solution of 0.7 g. 6-chloro-4,6-pregnadiene-3β,17α-diol-20-one-17 - caproate in 50 ml. chloroform, after the addition of 2 drops of about 11 n fluoro-boric acid, 50 ml. of an ether solutio nof diazomethane are added drop-by-drop with continual stirring.

After standing 6 hours at room temperature the excess diazomethane is desrtoyed by adding glacial acetic acid drop-by-drop. The solution is then washed with a 5% solution bicarbonate solution and water and is then dried and evaporated down. From the residue, by recrystallization from hexane, there is obtained 6-chloro-4,6-pregnadiene-3β,17α-diol-20-one-17 - caproate-3 - methyl-ether.

EXAMPLE 3

(a) 8 g. 6-chloro-4,6-pregnadiene-3β,17α-diol-20-one-diacetate are dissolved in 800 ml. methanol and are shaken 4 hours at room temperature with 6 ml. concentrate hydrochloric acid. The reaction mixture is then neutralized, concentrated to half its volume, and stirred into 1.5 liter water. The crude 6-chloro-4,6-pregnadiene-3β,17α-diol-20-one-17-acetate is filtered off with suction, washed with water, dried, and recrystallized from methanol. M.P. 226–227° C.

(b) By analogy to Example 1(b), from 3.7 g. 6-chloro-4,6-pregnadiene-3β,17α-diol-20-one-17 - acetate, with a mixture of 40 ml. pyridine and 45 ml. propionic anhydride, there are obtained 2.9 g. 6-chloro-4,6-pregnadiene-3β,17α-diol-20-one-17-acetate-3-propionate.

(c) By analogy to Example 1(c), 1.8 g. 6-chloro-4,6-pregnadiene-3β,17α-diol-20-one-17 - acetate are reacted, with an addition however of 0.3 ml. concentrated hydrochloric acid. The product after being worked up consists of 6-chloro-4,6-pregnadiene-3β,17α-diol-20-one-17-acetate-3-methyl-ether. After recrystallization it melts at 184–186° C. UV maxima 236, 244, 252 mμ;

$$E_{1cm}^{1\%} \; 485, 565, 382$$

EXAMPLE 4

(a) 2.5 g. 6-chloro-6-dehydro-17α-acetoxy-progesterone are reacted in 50 ml. absolute tetrahydrofuran with 1.6 g. lithium monohydrogen-tri-tert. butoxy-aluminate in ether solution. The reaction mixture is then boiled 2 hours under reflux. After working it up in the usual manner, there is obtained 6-chloro-4,6 - pregnadiene-3β,17α-diol-20-one-17-acetate. M.P. 226–227° C.; $(\alpha)_D$ —80° (chloroform).

In an analogous manner there is produced—

From 6-chloro-6-dehydro-16-methylene-17α - acetoxy-progesterone, the 6-chloro-16-methylene-4,6-pregnadiene-3β,17α-diol-20-one-17-acetate; and From 6 fluoro-6-dehydro-16-methylene-17α -acetoxy-progesterone, the 6-fluoro-16-methylene-4,6-pregnadiene-3β,17α-diol-20-one-17-acetate.

In a similar manner it is possible to obtain the 17-formates, -acetates, -propionates, -n-butyrates, -iso-butyrates, -n-valerates, -iso-valerates, -trimethyl - acetates, -caproates and -cyclopentyl-carbonates of the named compounds from the corresponding 17-acylates.

(b) a solution of 5.3 g. 6 - chloro - 4,6-pregnadiene-3β,17α-diol-20-one-17-acetate in 45 ml. anhydrous pyridine is cooled to 0° C. and reacted with 6 ml. isobutyryl chloride added to it drop-by-drop with continual stirring. After allowing it to stand about 4 hours at room temperature, the reaction mixture is diluted with water and the precipitated 6-chloro-4,6-pregnadiene-3β,17α-diol-20-one-17-acetate-3-isobutyrate filtered off with suction and recrystallized from methanol. Yield 3.9 g.

EXAMPLE 5

3 g. 6-chloro-16α-methyl-4,6-pregnadiene-3β,17α-diol-20-one-diacetate in 80 ml. methanol are heated under reflux 10 minutes with 380 mg. sodium methylate. The reaction mixture is then concentrated under vacuum, diluted with water, the 6-chloro-16α-methyl-4,6-pregnadiene-3β,17α-diol-20-one-acetate extracted with chloroform, and recrystallized from acetone. $\lambda_{max}$ 236, 243.5 and 252 mμ.

EXAMPLE 6

(a) 5 g. 6-methyl-6-dehydro-16-methylene - 17α - acetoxy-progesterone in 100 ml. absolute 17α-acetoxy-progesterone in 100 ml. absolute tetrahydrofuran are boiled 2 hours under reflux with 3.2 g. lithium monohydrogen-tri-tert.-butoxy-aluminate. By working it up in the usual manner the 6-methyl-16-methylene-4,6-pregnadiene - 3β,17α-diol - 20 - one-17 - acetate is isolated. M.P. 207–210° C. (methanol/ether); $(\alpha)_D^{20}$ —144° (chloroform); $\lambda_{max}$ 234, 242 and 251 mμ, $$E_{1cm}^{1\%} \; 511, 582, 391$$

(b) By analogy to Example 4(b), by treatment of 1 g. 6-methyl-16methylene-4,6-pregnadiene - 3β,17α - diol-20-one-17-acetate with 0.5 g. isovaleryl chloride, there is obtained 0.7 g. 6-methyl-16-methylene-4,6 - pregnadiene-3β,17α-diol-20-one-17-acetate-3-isovalerate.

(c) A solution of 4 g. 6-methyl-16-methylene-4,6-pregnadiene-3β,17α-diol-20 - one - 17 - acetate in 20 ml. pyridine and 20 ml. acetic anhydride after standing overnight are poured into water. The mixture is extracted with chloroform, the extracts washed with 5% hydrochloric acid, 5% sodium bicarbonate solution and water, dried, and evaporated down. From the residue there is obtained by crystallization from ether 3.6 g. 6-methyl-16-methylene-4,6-pregnadiene-3β,17α-diol-20-one - diacetate. M.P.

175–177° C., $(\alpha)_D^{20}$ −180° (chloroform); $\lambda_{max}$ 234, 242 and 250 m$\mu$, $E_{1\,cm.}^{1\%}$ 438, 482 and 312

(d) The solution of 0.2 g. 6-methyl-16-methylene-4,6-pregnadiene-3β,17α-diol -20- one - 17 - acetate in 20 ml. methanol, after the addition of 20 mg. p-toluene-sulfonic-acid are heated one hour under reflux. The reaction mixture is distilled to dryness and the residue taken up with chloroform. The chloroform solution is washed with 5% sodium bicarbonate solution and water and is then dried and distilled off. The crude 6-methyl-16-methylene-4,6-pregnadiene-3β,17α-diol-20-one-17-acetate - 3 - methyl-ether thus obtained is purified by thin-film chromatography. UV maxima: 235, 243, 251 m$\mu$;

$E_{1\,cm.}^{1\%}$ 464, 517, 346

CH$_3$O calculated, 7.5%; determined 7.2%.

In an analogous manner, by reaction with ethanol, the corresponding 3-ethyl-ether is obtained.

EXAMPLE 7

(a) By analogy to Example 6, 9 g. 1α,2α-methylene-6-chloro-4,6-pregnadiene-17α-ol-3,20-dione-17 - acetate are reduced to 1α,2α-methylene-6-chloro-4,6-pregnadiene-3β,17α-diol-20-one-17-acetate.

(b) A solution of 7 g. 1α,2α-methylene-6-chloro-4,6-pregnadiene-3β,17α-diol-20-one-17-acetate in 70 ml. pyridine and 70 ml. acetic anhydride is allowed to stand 18 hours at room temperature and is then poured into ice water. The crystalline precipitate is filtered off with suction and recrystallized from ethyl acetate. The yield is 6 g. 1α,2α - methylene - 6 - chloro - 4,6 - pregnadiene-3β,17α-diol-20-one-diacetate.

In an analogous manner from 3.7 g. 1α,2α-methylene-6-chloro-4,6-pregnadiene - 3β,17α - diol - 20 - one - 17-acetate with a mixture of 40 ml. pyridine and 45 ml. propionic anhydride there are obtained 2.9 g. 1α,2α-methylene-6-chloro-4,6-pregnadiene - 3β,17α - diol - 20-one-17-acetate-3-propionate.

(c) 0.7 g. 1α,2α-methylene-6-chloro-4,6 - pregnadiene-3β,17α-diol-20-one-17-acetate in 70 ml. ethanol is heated under reflux one hour. The mixture is then concentrated during which the 1α,2α-methylene-6-chloro-4,6-pregnadiene-3β,17α-diol-20-one-17-acetate-3 - ethyl - ether crystallizes out. UV maxima: 235, 245, 252 m$\mu$;

$E_{1\,cm.}^{1\%}$ 460, 530, 358

(d) By analogy to Example 6(c), from 0.8 g. 1α,2α-methylene-4,6-pregnadiene-3β,17α-diol-20-one-17 - acetate in 80 ml. methanol with an addition of 0.2 g. p-toluene-sulfonic acid, there is obtained the 1α,2α-methylene-4,6-pregnadiene-3β,17α-diol-20-one-17-acetate - 3 - methyl-ether.

EXAMPLE 8

(a) By analogy to Example 2(a), 5.5 g. 6-chloro-16-methylene - 4,6 - pregnadiene - 17α - ol - 3,20-dione-17-acetate are reduced by lithium - aluminum - hydride to 6-chloro-16-methylene-4,6 - pregnadiene - 3β,17α - diol - 20-one-17-acetate.

(b) By analogy to Example 4(b), by treatment of 1.8 g. 6-chloro-16-methylene-4,6-pregnadiene - 3β,17α - diol-20-one-17-acetate with 1 g. caproyl chloride, there are obtained 1.3 g. 6-chloro-16-methylene-4,6 - pregnadiene-3β,17α-diol-20-one-17-acetate-3-caproate.

(c) 1.2 g. 6-chloro-16 - methylene - 4,6 - pregnadiene-3β,17α-diol-20-one-17-acetate are dissolved in 15 ml. pyridine, at 0° C. 1.5 g. p-toluene-sulfonic-acid-chloride are slowly added and the mixture is allowed to stand 24 hours at 0° C. The reaction mixture is then poured into water and the 6-chloro-16-methylene - 4,6 - pregnadiene-3β,17α-diol-20-one-17-acetate-3-tosylate filtered off with suction.

0.9 g. of the crude tosylate is heated 6 hours in a nitrogen atmosphere to about 80° C. After cooling, it is diluted with ether, washed with sodium bicarbonate solution and water, and concentrated, during which is formed a crystalline precipitate of 6-chloro-16 - methylene - 4,6-pregnadiene-3,17α-diol-20-one-17-acetate-3-amyl-ether.

(d) In a pressure vessel, a mixture of 0.6 g. 6-chloro-16-methylene-4,6-pregnadiene-3β,17α-diol - 20 - one - 17-acetate, 50 ml. chloroform, 0.3 g. p-toluene-sulfonic acid and 50 ml. liquid isobutene is shaken 48 hours. The practically clear reaction mixture after being cooled is removed from the pressure vessel, slowly warmed to room temperature, washed with a 5% sodium bicarbonate solution and water, dried, and evaporated down. After recrystallization from ether, the 6-chloro-16-methylene-4,6-pregnadiene-3β,17α-diol-20-one-17-acetate - 3 - isobutyl-ether is obtained.

EXAMPLE 9

(a) By analogy to Example 1(a), 4.7 g. 6,16α-dimethyl-4,6-pregnadiene-17α-ol-3,20-dione-17-acetate was reduced to 6,16α-dimethyl-4,6-pregnadiene-3β,17α-diol-20-one-17-acetate.

(b) 2.7 g. 6,16α-dimethyl-4,6-pregnadiene-3β,17α-diol-20-one-17-acetate are mixed with 30 ml. acetic acid, 25 ml. acetic anhydride and 0.3 g. p-toluene sulfonic acid and allowed to stand 36 hours at room temperature. The mixture is then poured into ice water, the precipitated 6,16α - dimethyl - 4,6 - pregnadiene - 3β,17α - diol - 20-one-diacetate filtered off with suction and recrystallized from ether.

(c) 1.55 g. 6,16α-dimethyl-4,6-pregnadiene-3β,17α-diol-20-one-17-acetate and 0.16 g. potassium are heated in 20 ml. water-free toluene 6 hours with stirring under reflux. The solvent is distilled off under reduced pressure and the residue is heated 3 hours to 95° C. wilth 7 g. butyl bromide in 15 ml. dimethyl-formamide. After cooling the reaction mixture is diluted with water, the separated oil taken up with ether, and is chromatographed over a column of 25 g. silica gel. From the ether eluates, there is isolated 6,16α - dimethyl-4,6-pregnadiene-3β,17α-diol-20-one-17-acetate-3-butyl-ether.

EXAMPLE 10

(a) By analogy to Example 4, 3.2 g. 6-methyl-6-dehydro-17α-acetoxy-progesterone are reduced to 6-methyl-4,6-pregnadiene-3β,17α-diol-20-one-17-acetate.

(b) By analogy to Example 1(b) the product obtained from Example 10(a) is esterified to 6-methyl-4,6-pregnadiene-3β,17α-diol-20-one-diacetate.

(c) By analogy to Example 6(d), 1.3 g. 6-methyl-4,6-pregnadiene-3β,17α-diol-20-one-17-acetate with 130 ml. methanol and 200 mg. p-toluene sulfonic acid are reacted to 6 - methyl-4,6-pregnadiene-3β,17α-diol-20-one-17-acetate-3-methylether.

EXAMPLE 11

6 - chloro - 4,6 - pregnadiene - 3β,17α - diol - 20 - one-3-tetrahydro-pyranyl-ether-17-acetate is heated in 100 ml. ethanol containing 5% HCl 3 hours under reflux. Most of the solvent is evaporated off and the residue is stirred into water. After being worked up in the usual manner, the product obtained is 1.2 g. 6-chloro-4,6-pregnadiene-3β,17α-diol-20-one-17-acetate. M.P. 226–227° C.; $(\alpha)_D^{20}$ −80° (chloroform).

*Examples for pharmaceutical preparations*

(I) One tablet contains:

| | Mg. |
|---|---|
| 6 - chloro - 4,6 - pregnadiene - 3,17α - diol-20-one-17-acetate | 2 |
| Ethynyl estradiol | 0.02 |
| Lactose | 80 |
| Corn starch | 15 |
| Talc | 3 |

(II) One tablet contains:

| | Mg. |
|---|---|
| 6 - chloro - 4,6 - pregnadiene - 3,17α - diol - 20-one-diacetate | 2 |
| Ethynyl estradiol | 0.02 |
| Lactose | 60 |
| Potato starch | 30 |
| Talc | 5 |
| Magnesium stearate | 2 |

(III) One tablet contains:

| | Mg. |
|---|---|
| 6 - methyl - 16 - methylene - 4,6 - pregnadiene-3,17α-diol-20-one-17-acetate | 2.5 |
| Lactose | 80 |
| Methyl cellulose | 6 |

(IV) One tablet contains:

| | Mg. |
|---|---|
| 6 - chloro - 4,6 - pregnadiene - 3,17α - diol - 20-one-17-acetate-3-methylether | 2.5 |
| Lactose | 70 |
| Corn starch | 25 |
| Talc | 5 |
| Magnesium stearate | 1 |

(V) One tablet contains:

| | Mg. |
|---|---|
| 6 - methyl - 16 - methylene - 4,6 - pregnadiene-3,17α - diol - 20 - one -17 - acetate - 3 - methylether | 2 |
| Ethynyl estradiol-3-methylether | 0.02 |
| Lactose | 80 |
| Corn starch | 15 |
| Talc | 3 |

(VI) One ampoule contains:

| | | |
|---|---|---|
| 6 - chloro - 4,6 - pregnadiene - 3,17α - diol-20-one-17-acetate | mg | 60 |
| Estradiol-benzoate | mg | 15 |
| Castor oil | ml | 1 |
| Benzylbenzoate | ml | 1 |

(VIII) One ampoule contains:

| | | |
|---|---|---|
| 6 - chloro - 4,6 - pregnadiene - 3,17α - diol - 20-one-3-acetate-17-caproate | mg | 5 |
| Peanut oil | ml | 1.5 |

The ampoules are sterilized for about 1 hour at 140–160° C.

(VIII) One tablet contains:

| | Mg. |
|---|---|
| 6 - chloro - 4,6 - pregnadiene - 3,17α - diol - 20-one-17-acetate | 3 |
| Ethynyl estradiol methylether | 0.1 |
| Lactose | 75 |
| Corn starch | 15 |
| Talc | 3.5 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. 6 - chloro - 16 - methylene - 4,6 - pregnadiene - 3,17α-diol-20-one-17-acetate.
2. 1α,2α - methylene - 6 - chloro - 4,6 - pregnadiene-3,17α-diol-20-one-17-acetate.
3. 6 - chloro - 16 - methylene - 4,6 - pregnadiene - 3,17α-diol-20-one-diacetate.
4. 1α,2α - methylene - 6 - chloro - 4,6 - pregnadiene-3,17α-diol-20-one-diacetate.
5. 6 - chloro - 16 - methylene - 4,6 - pregnadiene - 3,17α-diol-20-one-17-acetate-3-methylether.
6. 6 - chloro - 16 - methylene - 4,6 - pregnadiene - 3,17α-diol-20-one-17-acetate-3-ethylether.
7. 6,16 - dimethyl - 4,6 - pregnadiene - 3,17α - diol - 20-one-17-acetate-3-methylether.
8. 1α,2α - methylene - 6 - chloro - 4,6 - pregnadiene-3,17α-diol-20-one-17-acetate-3-methylether.

References Cited

UNITED STATES PATENTS

| 3,126,399 | 3/1964 | Sollman | 260—397.4 |
| 3,174,984 | 3/1965 | Graber et al. | 260—397.4 |

LEWIS GOTTS, *Primary Examiner.*

HENRY A. FRENCH, *Assistant Examiner.*